United States Patent [19]
Yokokawa et al.

[11] 3,980,729
[45] Sept. 14, 1976

[54] SILICONE RESIN COMPOSITIONS

[75] Inventors: Kiyoshi Yokokawa; Jyun Koizumi, both of Annaka; Kesayuki Yanagisawa, Matsuida, all of Japan

[73] Assignee: Shin-Etsu Chemical Company Limited, Tokyo, Japan

[22] Filed: June 13, 1975

[21] Appl. No.: 586,634

[30] Foreign Application Priority Data
June 19, 1974    Japan.............................. 49-69968

[52] U.S. Cl. ......................... 260/826; 260/37 SB; 260/47 R; 260/52; 260/67 A; 260/824 R
[51] Int. Cl.² ................. C08L 43/04; C08L 83/00
[58] Field of Search ................ 260/824 R, 826

[56] References Cited
UNITED STATES PATENTS

| | | | |
|---|---|---|---|
| 2,825,712 | 3/1958 | Witzel | 260/43 |
| 2,894,931 | 7/1959 | Somerville | 260/824 R |
| 3,308,008 | 3/1967 | Romay | 260/826 |
| 3,316,140 | 4/1967 | Sonnabend | 161/198 |
| 3,385,824 | 3/1968 | Smith | 260/52 |
| 3,405,091 | 10/1968 | Sprengling | 260/47 |
| 3,812,201 | 5/1974 | Bey | 260/824 R |

Primary Examiner—Paul Lieberman
Attorney, Agent, or Firm—Toren, McGeady and Stanger

[57]    ABSTRACT

The resin composition comprises (a) 100 parts by weight of a silicone resin, (b) from 5 to 300 parts by weight of a phenolic prepolymer constructed by repeated xylylene units and phenylene units having phenolic hydroxy groups, (c) a silanol-condensation catalyst, and (d) a curing catalyst for phenol resins. These compositions have a very good processability for fabrication by molding, laminating or by other means, and the fabricated articles can enjoy the excellent properties inherent in silicone resins with respect to thermal stability and electric properties, and in phenolic resins with respect to mechanical strengths and anti-solvent resistance.

9 Claims, No Drawings

SILICONE RESIN COMPOSITIONS

FIELD OF THE INVENTION

This invention relates to a novel silicone resin composition capable of endowing articles fabricated therewith with very much improved mechanical properties, such as, flexural strength as well as excellent antisolvent resistance and thermal stability.

DESCRIPTION OF THE PRIOR ART

Silicone resins have become widely employed in a wide variety of commercial applications including the manufacture of electric insulation materials by virtue of their excellent thermal stability and electric insulation despite the defect of articles made therefrom, i.e., relatively poor mechanical strength. In fact, articles fabricated with conventional silicone resin compositions have rather poor mechanical strengths at room temperature, but superior mechanical strengths after prolonged heating at 300°C or higher, compared to articles fabricated with such resins as phenol resins, epoxy resins and unsaturated polyester resins that are usually employed as constructive materials. The conventional silicone resin articles used as parts for electric insulation or high-temperature duty often become cracked or broken off at the corners when they are fastened or connected to other devices or parts by caulking, bolting, or by other means. For purposes of improving the mechanical strength of the finished articles, it have been proposed to impregnate the silicone resins with glass fibers. However, the silicone resin compositions which are loaded with as high as 50% by weight of glass fiber required for satisfactory improvement of the mechanical strength are so bulky that their workability becomes very poor and makes fabrication with these materials very difficult and troublesome. In addition, such fabricated articles loaded with the reinforcing glass fiber can exhibit a considerably improved impact strength, but their flexural strength is improved only by 1.5 to 2 times which is unsatisfactory, or is about the same or lower than that of articles made from ordinary organic resin other than silicone resins with no impregnated reinforcing material.

Furthermore the silicone resin articles have rather a poor anti-solvent resistance, and are not suitable for use as, for example, laminated products which are used in places in contact with an organic solvent.

OBJECTS OF THE INVENTION

Therefore, it is an object of this invention to provide silicone resin compositions having good workability for molding, laminating and other fabricating means. A further object of the invention is to provide silicone resin compositions that are capable of endowing articles made therefrom with excellent properties with respect to thermal stability, electric characteristics, and anti-solvent resistance as well as mechanical strength.

SUMMARY OF THE INVENTION

The present invention provides silicone resin compositions free from the above drawbacks and comprising the following components.

a. 100 parts by weight of an organopolysiloxane resin represented by the average unit formula $$R_m'SiO_{\frac{4-m}{2}} \quad (I)$$

where $R^1$ is a substituted or unsubstituted monovalent hydrocarbon group and $m$ is a positive number from 0.5 to 1.8 having at least 0.25% by weight of residual hydroxy groups directly bonded to silicon atoms, b. from 5 to 300 parts by weight of a phenolic prepolymer represented by the general formula

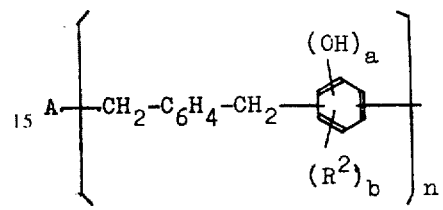

$$CH_2-C_6H_4-CH_2-A \quad (II)$$

where A is a halogen atom, an alkoxy group, or a phenolic group of the general formula

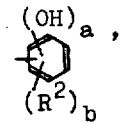

$R^2$ is an organic group or an amino group, $a$ is 1, 2 or 3, $b$ is 0, 1 or 2 with the proviso that the total value of $a$ and $b$ is equal to or less than 4 and $n$ is a positive integer, c. a silanol-condensation catalyst, and
d. a curing catalyst for phenol resins.

DETAILED DESCRIPTION OF THE INVENTION

To describe the invention in detail, component (a) contained in its composition is a conventional organopolysiloxane resin represented by the average unit formula (I) above. The organopolysiloxane is composed of several siloxane units, such as, $C_6H_5SiO_{1.5}$, $(C_6H_5)_2SiO$, $CH_3SiO_{1.5}$, $(CH_3)_2SiO$, $(CH_3)(C_6H_5)SiO$, $CH_2=CHSiO_{1.5}$, $(CH_2=CH)(CH_3)SiO$, $C_2H_5SiO_{1.5}$, $SiO_2$ and $CF_3CH_2CH_2CH_2SiO_{1.5}$. It is formed by cohydrolysis of a mixture of corresponding chlorosilanes or alkoxysilanes, followed by the dehydration condensation of the hydrolyzate. In the organopolysiloxane according to the invention, the ratio of the number of organic groups $R^1$ bonded to silicon atoms to the number of the silicon atoms Si, vig., $R^1/Si$, must be within the range from 0.5 to 1.8. Further it is required that the organopolysiloxane has at least 0.25% by weight of residual hydroxy groups directly bonded to the silicon atoms. When the $R^1/Si$ ratio is smaller than 0.5, the siloxane resins have such high functionality that they tend to gel during the preparation of the proposed composition, and articles fabricated therefrom usually exhibit a very high brittleness. On the contrary, when the R¹/Si ratio is larger than 1.8, the compositions have an extremely low curing velocity, and articles fabricated therefrom are inferior in hardness and thermal stability. Further, if the amount of the silicon-bonded residual hydroxy groups is smaller than 0.25% by weight, the curing velocity of the resin composition is unduly low, and fabricated articles made from such composition have poor mechanical strengths as well as heat softening properties. Its preferable range is from 1 to 5% by weight.

Component (b) contained in the compositions of the present invention is a phenolic prepolymer represented by formula (II) above, being the most characteristic component for the composition to be endowed with the desirable properties. This component (b) may be prepared by a condensation reaction in the presence of a Friedel-Crafts catalyst, e.g., SnCl₄, between a phenolic compound and an α,α'-dialkoxyxylene according to the following reaction formula:

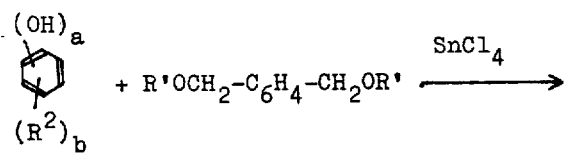

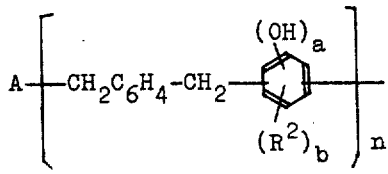

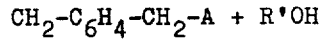

or by a dehydrohalogenation reaction in the presence of the same catalyst between a phenolic compound and an α,α'-dihalogenoxylene according to the following reaction formula:

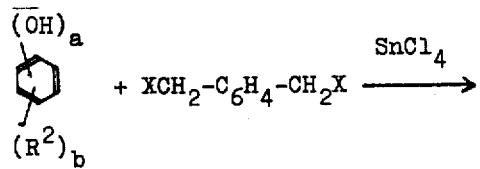

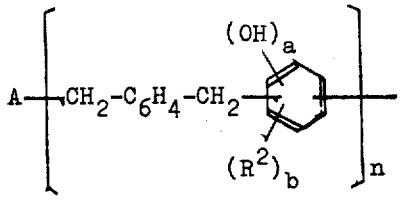

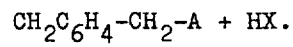

In the above reaction formulas, the symbols A, R², a, b and n have the same meanings as in the definition of formula (II), and R' denotes an alkyl group, such as, methyl, ethyl, propyl and butyl, and X is a halogen atom. The groups denoted by R² are exemplified by organic groups, such as, —CH₃, —C₂H₅, —C₃H₇, —C(CH₃)₃, —C(C₂H₅)₂(C₃H₇), —C(CH₃)(C₃H₇)₂, —C(CH₃)(C₂H₅)(C₄H₉), —C(CH₃)₂(C₆H₁₁), —C₆H₅, —CH(C₆H₄OH)(C₂H₅) and —CH₂(C₆H₄OH), and an amino group —NH₂.

Component (b) has a molecular weight in a range such that it may be appropriately called a prepolymer with n having a value not exceeding 12 at the highest or most usually up to 7. Values of n which are too high lead to poor workability or flow behavior for the resin compositions concerned.

Component (b) has a curing mechanisms similar to those of novolac-type phenol resins, for it is a prepolymer of a thermo-setting resin which is curable to three-dimensional structure by the action of a curing catalyst such as hexamethylenetetramine. Component (b) itself is usually employed in the form of powdery or granular molding materials or prepregs for lamination capable of giving fabricated articles with mechanical strengths 2 to 3 times higher than those of articles formed of conventional silicone resins, as well as with excellent anti-solvent resistance.

Generally, materials for fabrication prepared from such a phenolic prepolymer introduce several problems to the processes of fabrication. Namely, the materials cannot attain complete curing even with a sufficient amount, e.g. up to 10 to 20% by weight, of a curing catalyst in the fabrication process at 160° to 180°C, leading to the necessity of postcuring at 200° to 250°C in order to complete the final curing. Because of the large volume of gas evolution in the fabrication step, fabricated articles are apt to become blistered on release of pressure by opening the metal mold which has been operated with heating in a closed condition. The undesired blistering phenomenon should be avoided by carrying out troublesome degassing during the initial 1 to 2 minutes of the molding operation at a rate of 2 to 3 times per minute. Furthermore, postcuring has to be conducted very carefully in an oven under a precise temperature control, beginning with about 170°C and ending at 250°C after about 24 hours, the temperatures being elevated in a stepwise manner. This is because the fabricated articles to be postcured tend to become blistered or cracked when abruptly and directly put into an atmosphere at a temperature higher than 200°C, and possess very poor mechanical strengths and electric insulation.

On the other hand, it is the usual understanding that the direct blending of two different kinds of thermosetting resins does not produce a favorable effect to the properties of the resultant mixed resins, but rather lead to an unexpected enlargement of the defects in both resins. One of the widely adopted techniques in resin blending is the addition of a third substance with relatively good compatibility with each of the resins to be blended. Alternatively, the resins are chemically combined in advance by cocondensation or copolymerization. Both techniques are sometimes impractical due to complexity in the processing along with the adverse effects, such as, lower curability due to decreased functional groups and poorer workability in the fabrication due to decreased flowing.

The resin composition prepared by blending components (a) and (b) with the addition of a silanol-condensation catalyst and a curing catalyst for phenol resins in accordance with the present invention can be cured satisfactorily by heating to form fabricated articles endowed with ideally excellent properties, i.e., thermal stability and electric properties that are ascribable to the existence of component (a) and mechanical strengths and anti-solvent resistance that are ascribable to the existence of component (b), regardless of the completely dissimilar molecular structures and curing mechanisms of the two components.

The fabrication process of the composition in accordance with the present invention may be the same as that of the conventional silicone resin-based compositions. The workability of the compositions of the invention is very good with no blistering even when they are fabricated into rather thick articles. Further, the post-curing of fabricated articles can satisfactorily be carried out by directly putting them into an atmosphere of a temperature ranging from 200° to 250°C without stepwise temperature elevation. The remarkable advantages of the present invention described above cannot be expected from the knowledge in the prior art.

The silanol-condensation catalyst as component (c) included in the composition of the present invention may be any of the conventional ones, for example, organic amines, such as, monoethanolamine, diethanolamine, ethylenediamine, triethylenediamine and triethanolamine, heavy metal compounds, such as, lead oxides, lead carbonate, lead octoate, carboxylic acids including acetic acid, stearic acid and octylic acid, and salts of carboxylic acids and heavy metals (for example, iron, lead, zinc, cobalt and manganese), and quaternary ammonium compounds, such as, tetramethylammonium hydroxide. This component (c) is present in an amount of from 0.01 to 3% by weight based on the amount of component (a).

The curing catalyst for phenol resins as component (d) may also be any of the conventional ones, but the most preferred is hexamethylenetetramine. This component (d) is present in an amount of from 1 to 20% by weight, preferably from 5 to 15% by weight, based on the amount of component (b). Larger amounts of component (d) usually result in a poorer flow to the fabricating composition. In particular, when hexamethylenetetramine is used as the curing catalyst in excess amounts, there arises the undesired blistering phenomenon due to the generation of ammonia gas in large amounts when it is decomposed, and also the deterioration of the electric properties due to ammonia remaining in the finished articles.

The silicone resin composition of the present invention may be optionally admixed with inorganic fillers, thermally-stable pigments, lubricants and other additives. Illustrative of the inorganic fillers are powdery fillers, such as, diatomaceous earth, clay, powdered quartz, powdered fused quartz, glass powder, glass beads, magnesia, titanium dioxide and alumina, and fibrous fillers, such as, glass fiber, asbestos fiber and carbon fiber. The fibrous fillers include those represented by chopped strands having a relatively short length of fibers, say, in the range of from 1 to 10 mm, those represented by rovings and yarns shaped into fluxes of sufficiently long filaments and those represented by cloths and mats that are sheet-shaped.

The silicone resin compositions of the present invention are obtained in the form of powdery or granular molding material or in the form of sheet-like material for lamination. According to the invention, components (a) to (d) are optionally blended with other additives, such as, fillers, pigments, and lubricants by means of, for example, a two-roller mill heated at a temperature higher than the softening temperature of either component (a) or (b), and the blended composition is cooled and crushed into powders or granules. In an alternative method, the mixture of components (c), (d) and, optionally, the other additives are added to a solution of components (a) and (b) in an organic solvent, such as, ketones (e.g., acetone and methylethylketone) or ethers of ethyleneglycol (e.g., ethyleneglycol monoethylether) to produce a dispersion, and with the dispersion thus produced, rovings, yarns, cloths or mats of glass, asbestos or carbon fibers are impregnated by spraying or dipping. The thus impregnated fibrous materials are then dried and finished into materials suitable for filament winding techniques using long filaments, materials suitable for compression molding using filaments 3 to 10 mm long cut and sheet-like materials suitable for lamination.

The molding techniques for the silicone resin compositions of the present invention may include compression molding, transfer molding, injection molding and the like. Recommended conditions for compression molding involve the temperature of the metal mold being from 160° to 200°C, the pressure being from 10 to 400 kg/cm$^2$ and the molding time being from 3 to 5 minutes; those for transfer molding involve the temperature of the metal mold being from 160° to 200°C and the molding time being from 1 to 3 minutes; and those for injection molding involve the temperature of the metal mold being from 170° to 220°C and the molding time being from 30 seconds to 2 minutes. In any of the fabrication techniques, postcuring is indispensable in order to obtain articles having the highest mechanical strengths and other physical properties. The temperature at which the postcuring is carried out is preferably in the range of from 200° to 250°C, and fabricated articles to be postcured may be put directly into the atmosphere kept at the above temperature. Since the postcuring process can be carried out in an atmosphere without the necessity of the stepwise temperature elevation as in the fabrication of the conventional silicone resin compositions, the compositions of the present invention can offer a very high productivity of fabricated articles.

The finished articles obtained from the compositions of the present invention in accordance with the above-described procedure have mechanical strengths sufficient to withstand cracking due to any stress in the fastening by caulking, bolting or by other means, as well as excellent thermal stability and anti-solvent resistance.

The following examples are to illustrate the present invention. The parts and percentages in the examples are all parts and percentages by weight, if not otherwise indicated.

Example 1

Mixtures (Samples 1, 2, 3 and 4) were formulated by adding, to 100 parts of a silicone resin composed of 50 mole % of $CH_3SiO_{1.5}$ units, 35 mole % of $C_6H_5SiO_{1.5}$ units and 15 mole % of $(C_6H_5)_2SiO$ units and having 4.2% of residual hydroxy groups directly bonded to the silicon atoms, a phenolic prepolymer obtained by the condensation reaction between α,α'-dimethoxyparaxylene and phenol in the presence of $SnCl_4$ as a Friedel-Crafts catalyst and expressed by the formula

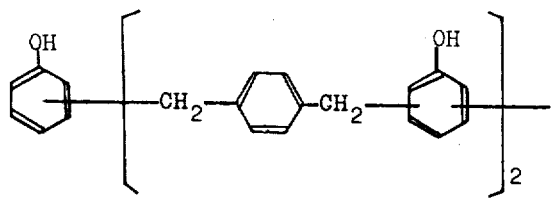

in varied amounts as set out in Table I, together with 1 part of lead carbonate, 1 part of benzoic acid, 11% of hexamethylenetetramine based on the amount of the phenolic prepolymer, 200% of quartz powder based on the total amount of the silicone resin and the phenolic prepolymer and 1% of calcium stearate based on the total amount of the silicone resin and the phenolic prepolymer. The resulting mixtures were kneaded on a hot roller mill at 90°C for 10 minutes to form compositions, which were then cooled and crushed to give molding compositions.

As controls, Samples 5 and 6 were similarly formulated, however one excluded the phenolic prepolymer and the other excluded the silicone resin.

Each of the molding compositions thus obtained were fabricated by compression molding at 180°C under a pressure of 100 kg/cm² for 5 minutes with subsequent postcuring at 200°C for 2 hours. The thus fabricated articles were tested to determine the various properties. The results are shown in Table 1.

Table I

| Sample No. | 1 | 2 | 3 | 4 | 5 | 6** |
|---|---|---|---|---|---|---|
| Silicone resin, parts | 100 | 100 | 100 | 100 | 100 | 0 |
| Phenolic prepolymer, parts | 10 | 50 | 100 | 200 | 0 | 100 |
| Flexural strength, determined at room temperature, kg/mm² | | | | | | |
| Initially | 7.5 | 8.9 | 9.4 | 10.3 | 6.0 | 11.5 |
| After aging of: | | | | | | |
| 24 hrs. at 300°C | 7.3 | 8.5 | 9.0 | 9.7 | 5.8 | 6.7 |
| 48 hrs. at 300°C | 7.0 | 8.1 | 8.5 | 9.3 | 5.8 | 2.3 |
| Dielectric strength, × 10⁻³ | 5.3 | 7.8 | 8.5 | 9.2 | 3.3 | 13.0 |
| Anti-arc resistance, sec. | 250 | 240 | 240 | 230 | 250 | 185 |
| Anti-solvent resistance, %* | 90 | 95 | 95 | 100 | 85 | 100 |

*Test pieces immersed in toluene at 90°C for 100 hours were tested for flexural strength and the results were given in percent of the value before immersion in toluene.
**Lead carbonate and benzoic acid were omitted.

Example 2

A mixture (Sample No. 7) was formulated by adding, to 100 parts of a silicone resin composed of 30 mole % of $CH_3SiO_{1.5}$ units, 10 mole % of $(CH_3)_2SiO$ units, 10 mole % of $(CH_3)(C_6H_5)SiO$ units and 50 mole % of $C_6H_5SiO_{1.5}$ units and having 1.6% of residual hydroxy groups directly bonded to the silicon atoms, 100 parts of a phenolic prepolymer prepared by the condensation reaction between α,α'-dimethoxyparaxylene and p-phenylphenol in the presence of $SnCl_4$ as a Friedel-Crafts catalyst and expressed by the formula

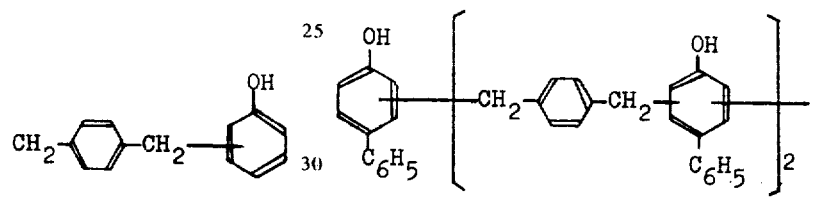

80 parts of diatomaceous earth, 0.2 part of triethanolamine, 13 parts of hexamethylenetetramine, 0.2 part of propionic acid and 2 parts of calcium stearate. The resulting mixture was put into 300 parts of methylethylketone and well blended together on a ball mill for 16 hours to form a uniform dispersion, having a viscosity of 100 centipoise at 20°C.

Into the dispersion thus obtained, a piece of glass cloth (WE-17-104B, Nitto Spinning Co., Japan) was dipped, followed by taking it out and drying at 130°C for 1 minute to remove the solvent (methylethylketone) and produce prepregs with 50% solid pick up. 30 Sheets of these prepregs were pressed together at 170°C under pressure of 80 kg/cm² for 15 minutes with subsequent postcuring at 200°C for 2 hours, to form a laminated plate 3.5 mm thick. The properties of the laminate thus obtained are shown in Table II.

As controls, Samples 8 and 9, one excluding the phenolic prepolymer and the other excluding the silicone resin, were formulated as follows. Sample 8 was formulated by mixing 100 parts of the silicone resin, 1 part of lead carbonate, 1 part of benzoic acid, 40 parts of diatomaceous earth and 1 part of calcium stearate, and putting the resulting mixture into 150 parts of methylethylketone, to form a uniform dispersion having a viscosity of 105 centipoise at 20°C. Sample 9 was formulated by mixing 100 parts of phenolic prepolymer, 40 parts of diatomaceous earth, 12 parts of hexamethylenetetramine and 1 part of calcium stearate and putting the resulting mixture into 150 parts of methylethylketone to form a uniform dispersion having a viscosity of 120 centipoise at 20°C.

These control samples 8 and 9 were subjected to the same procedure as Sample 7, and the resulting laminates were tested to determine their properties. The results are set out in Table II.

Table II

| Sample No. | 7 | 8 | 9 |
|---|---|---|---|
| Flexural strength, determined at room temperature, kg/mm² | | | |
| Initially | 38 | 18 | 50 |
| After aging of: | | | |
| 24 hrs. at 300°C | 31 | 17 | 13 |
| 48 hrs. at 300°C | 28 | 17 | 6 |
| Dielectric strength, × 10⁻³ | 7.3 | 2.7 | 15 |
| Anti-arc resistance, sec. | 230 | 250 | 180 |
| Anti-solvent resistance, % | 95 | 75 | 100 |

Example 3

Into a Henschel mixer were charged 100 parts of a silicone resin composed of 30 mole % of $CH_3SiO_{1.5}$ units, 30 mole % of $(CH_3)(C_6H_5)SiO$ units, 20 mole % of $(C_6H_5)_2SiO$ units and 20 mole % of $C_6H_5SiO_{1.5}$ units and having 3.7% of residual hydroxy groups directly bonded to the silicon atoms, 300 parts of a phenolic prepolymer prepared by the dehydrochlorination reaction between α,α'-dichloroparaxylene and phenol in the presence of $SnCl_4$ as a Friedel-Crafts catalyst and expressed by the formula

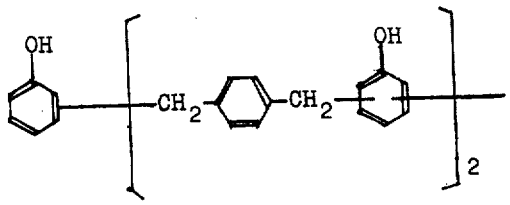
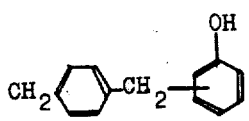

and further 300 parts of powdery fused quartz, 100 parts of alumina powder, 100 parts of glass chopped strands having fibers 6 mm long, 1 part of lead carbonate, 1 part of lauric acid, 30 parts of hexamethylenetetramine and 1.2 parts of calcium stearate. The mixer thus loaded was operated for 7 minutes at a velocity of 1,200 r.p.m. with its jacket heated at 50°C, to form a granular composition having an average particle size of about 15 mesh (Tyler).

The molding composition (Sample 10) thus prepared was then fabricated with a screw-in-line type injection molding machine (Model KI-50, Matsuda Works Co., Japan) with the metal mold heated at 190°C at a rate of 1 shot per 1.5 minutes. The various properties of the thus fabricated articles are shown in Table III.

As controls, samples 11 and 12 were prepared as follows. Sample 11 was formulated with the silicone resin only, excluding the phenolic prepolymer and hexamethylenetetramine, the amounts of the silicone resin, lead carbonate and lauric acid being increased to 400 parts, 4 parts and 4 parts, respectively. Sample 12 was formulated with the phenolic prepolymer only, excluding the silicone resin, lead carbonate and lauric acid, the amounts of the phenolic resin and hexamethylenetetramine being increased to 400 parts and 40 parts, respectively, and those of the other components being the same as used in the formulation of Sample 10.

Table III

| Sample No. | 10 | 11 | 12 |
|---|---|---|---|
| Flexural strength, determined at room temperature, kg/mm² | | | |
| Initially | 10.5 | 6.5 | 12.3 |
| After aging of: | | | |
| 24 hrs. at 300°C | 9.8 | 6.3 | 6.7 |
| 48 hrs. at 300°C | 8.3 | 6.0 | 2.2 |
| Dielectric strength, × 10⁻³ | 9.4 | 3.7 | 12 |
| Anti-arc resistance, sec. | 200 | 250 | 180 |
| Anti-solvent resistance, % | 95 | 80 | 100 |

Example 4

A dispersion in ethyleneglycol monoethylether, having a 55% solid content was prepared by dispersing the same phenolic prepolymer as employed in Example 1 and a silicone resin composed of 20 mole % of $SiO_2$ units, 20 mole % of $CH_3SiO_{1.5}$ units, 50 mole % of $C_6H_5SiO_{1.5}$ units and 10 mole % of $(CH_3)_2SiO$ units and having 4.7% of residual hydroxy groups directly bonded to the silicon atoms in the amounts indicated in Table IV together with 20% of clay, 1% of calcium stearate and 20% of titanium dioxide, all based on the total amount of the silicone resin and the phenolic prepolymer, 0.3% of each triethylenediamine and phthalic acid based on the amount of the silicone resin and 12% of hexamethylenetetramine based on the amount of the phenolic prepolymer.

Glass rovings (ER-2310, Asahi Glass Fiber Co., Japan) were dipped in the dispersion prepared above and dried at 150°C to remove the solvent with subsequent cutting in 6 mm lengths into a molding composition. The solid pick up of the rovings was 45%. The molding composition was fabricated by compression molding at 170°C under pressure of 350 kg/cm² for 7 minutes. The properties of the fabricated articles are shown in Table IV.

Table IV

| Sample No. | 13 | 14 | 15 | 16* | 17* |
|---|---|---|---|---|---|
| Silicone resin, parts | 100 | 100 | 100 | 100 | 0 |
| Phenolic prepolymer, parts | 50 | 150 | 250 | 0 | 100 |
| Flexural strength, determined at room temperature, kg/mm² | | | | | |
| Initially | 15.9 | 22.3 | 25.1 | 11.3 | 26.3 |
| After aging of: | | | | | |
| 24 hrs. at 300°C | 14.8 | 20.2 | 21.7 | 10.7 | 10.1 |
| 48 hrs. at 300°C | 14.1 | 19.7 | 19.7 | 10.5 | 5.2 |

Table IV-continued

| Sample No. | 13 | 14 | 15 | 16* | 17* |
|---|---|---|---|---|---|
| Dielectric strength, × 10⁻³ | 6.5 | 8.5 | 10 | 2.8 | 15 |
| Anti-arc resistance, sec. | 240 | 230 | 210 | 250 | 180 |
| Anti-solvent resistance, % | 80 | 90 | 95 | 75 | 100 |

*Control sample.

Example 5

To 100 parts of the same silicone resin as used in Example 1 were added 100 parts of a phenolic prepolymer expressed by the formula

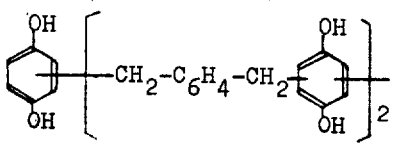

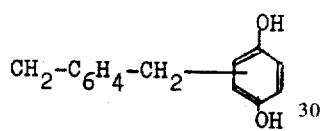

prepared in the presence of a Friedel-Crafts catalyst, 1 part of lead carbonate, 1 part of benzoic acid, 11 parts of hexamethylenetetramine, 2 parts of calcium stearate, 200 parts of quartz powder. The resulting mixture (Sample 18) was kneaded on a hot roller mill at 90°C for 10 minutes, and then cooled and crushed to produce a molding composition. This molding composition was fabricated by compression molding at 180°C under the pressure of 100 kg/cm² for 5 minutes with subsequent postcuring at 200°C for 2 hours. The thus fabricated article was tested to determine the various properties, the results of which are set out in Table V.

Table V

| Sample 18 | |
|---|---|
| Flexural strength, determined at room temperature, kg/mm²: | |
| Initially | 8.8 |
| After aging of: | |
| 2 hrs. at 200°C | 8.7 |
| 48 hrs. at 300°C | 7.8 |
| Dielectric strength, × 10⁻³ | 9.2 |
| Anti-arc resistance, sec. | 240 |
| Anti-solvent resistance, % | 95 |

Example 6

A mixture (Sample 19) was prepared by the same procedure as set forth in Example 5 except the phenolic prepolymer was a compound having the following formula:

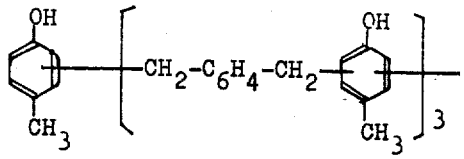

From the above mixture was formed a molding composition, and from this molding composition was produced a fabricated article in accordance with the same procedure as indicated in Example 5. The fabricated article exhibited the various properties as set out in Table VI.

Table VI

| Sample 19 | |
|---|---|
| Flexural strength, determined at room temperature, kg/mm²: | |
| Initially | 7.8 |
| After aging of: | |
| 2 hrs. at 200°C | 7.5 |
| 48 hrs. at 300°C | 7.0 |
| Dielectric strength, × 10⁻³ | 9.0 |
| Anti-arc resistance, sec. | 210 |
| Anti-solvent resistance, % | 90 |

Example 7

A mixture (Sample 20) was prepared by the same procedure as set forth in Example 5 except that the phenolic prepolymer was a compound having a higher polymerization degree and expressed by the following formula:

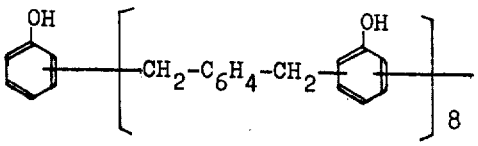

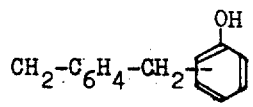

From the above mixture was formed a molding composition, and from this molding composition was produced a fabricated article in accordance with the same procedure as indicated in Example 5. The fabricated article exhibited the various properties as set out in Table VII.

Table VII

| Sample 20 | |
| --- | --- |
| Flexural strength, determined at room temperature, kg/mm$^2$: | |
| Initially | 8.8 |
| After aging of: | |
| 2 hrs. at 200°C | 8.4 |
| 48 hrs. at 300°C | 8.2 |
| Dielectric strength, × 10$^{-3}$ | 8.5 |
| Anti-arc resistance, sec. | 240 |
| Anti-solvent resistance, % | 95 |

Example 8

A dispersion in ethyl "Cellosolve", having a 55% solid content (Sample 21) was prepared by dispersing 100 parts each of the same silicone resin and phenolic prepolymer as used in Example 4 together with 40 parts of clay, 40 parts of titanium dioxide, 0.09 part of choline (beta-hydroxyethyl-trimethylammonium hydroxide), 0.1 part of 2-ethylhexanoic acid, 12 parts of hexamethylenetetramine and 2 parts of calcium stearic acid. Into this dispersion was dipped the same glass rovings as used in Example 4 so that the solid pick up of the rovings became 45%. The rovings thus treated were heated to 150°C. so that the ethyl "Cellosolve" contained therein evaporated, and then cut into pieces 6 mm long, which were then subjected to fabrication by compression molding at 180°C under a pressure of 350 kg/cm$^2$ for 7 minutes. The properties of the fabricated article are shown in Table VIII.

Table VIII

| Sample 21 | |
| --- | --- |
| Flexural strength, determined at room temperature, kg/mm$^2$: | |
| Initially | 20.7 |
| After aging of: | |
| 24 hrs. at 300°C | 19.2 |
| 48 hrs. at 300°C | 18.5 |
| Dielectric strength, × 10$^{-3}$ | 7.2 |
| Anti-arc resistance, sec. | 230 |

What is claimed is:
1. A silicone resin composition which comprises
a. 100 parts by weight of an organopolysiloxane resin represented by the average unit formula

$$R_m{}^1 SiO_{\frac{4-m}{2}}$$

wherein R$^1$ is a substituted or unsubstituted monovalent hydrocarbon group and $m$ is a positive number from 0.5 to 1.8, and having at least 0.25% by weight of residual hydroxy groups directly bonded to silicon atoms,
b. from 5 to 300 parts by weight of a phenolic prepolymer expressed by the general formula

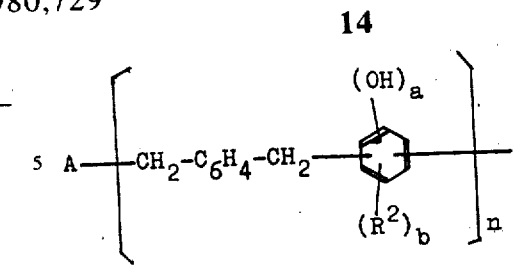

where A is a halogen atom, an alkoxy group or a monovalent organic group expressed by the general formula

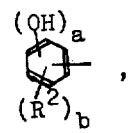

R$^2$ is an organic group or an amino group, $a$ is 1, 2, or 3, $b$ is 0, 1 or 2 with the proviso that the total value of $a$ and $b$ is equal to or less than 4 and $n$ is a positive integer,
c. a silanol-condensation catalyst, and
d. a curing catalyst for phenol resins.
2. The silicone resin composition as claimed in claim 1 wherein said organopolysiloxane resin has from 1 to 5% by weight of residual hydroxy groups directly bonded to silicon atoms.
3. The silicone resin composition as claimed in claim 1 wherein said R$^1$ is selected from the class consisting of methyl, ethyl, vinyl, phenyl and 4,4,4-trifluorobutyl groups.
4. The silicon resin composition as claimed in claim 1 wherein said R$^2$ is selected from the class consisting of methyl, ethyl, propyl, tert-butyl, 1,1-diethylbutyl, 1-methyl-1-propylbutyl, 1-methyl-1-ethylpentyl, 1,1-dimethylhexyl, phenyl, 1-(p-hydroxyphenyl)propyl, p-hydroxyphenylmethyl and amino groups.
5. The silicone resin composition as claimed in claim 1 wherein said $n$ is a positive integer not exceeding 12.
6. The silicone resin composition as claimed in claim 1 wherein said silanol-condensation catalyst is selected from the class consisting of organic amines, heavy metal compounds and quaternary ammonium compounds.
7. The silicone resin composition as claimed in claim 1 wherein said silanol-condensation catalyst is present in an amount of from 0.01 to 3% by weight based on the amount of said component (a).
8. The silicone resin composition as claimed in claim 1 wherein said curing catalyst for phenol resins is hexamethylenetetramine.
9. The silicone resin composition as claimed in claim 1 wherein said curing catalyst for phenol resins is present in an amount of from 1 to 20% by weight based on the amount of said component (b).

* * * * *